United States Patent

Rantanen

[11] Patent Number: 5,282,391
[45] Date of Patent: Feb. 1, 1994

[54] COUPLING FOR A LINEAR PULLING DEVICE

[75] Inventor: Matti Rantanen, Kirkkonummi, Finland

[73] Assignee: Orion-Yhtymä Oy, Espoo, Finland

[21] Appl. No.: 849,468

[22] Filed: Mar. 11, 1992

[30] Foreign Application Priority Data

Mar. 25, 1991 [FI] Finland ............................... 911434

[51] Int. Cl.⁵ .......................... F16H 27/02; F16D 3/52
[52] U.S. Cl. ..................................... 74/89.15; 464/89
[58] Field of Search ............... 74/89.1, 89.15; 464/89, 464/91

[56] References Cited

U.S. PATENT DOCUMENTS

| 2,956,187 | 10/1960 | Wood | 464/89 X |
| 4,012,923 | 3/1977 | Lundgren | 464/90 |
| 4,242,782 | 1/1981 | Hanneken et al. | 464/91 X |
| 4,269,043 | 5/1981 | Kizu et al. | 464/83 |
| 4,709,178 | 11/1987 | Burr | 464/89 X |

FOREIGN PATENT DOCUMENTS

WO92/02849 2/1992 World Int. Prop. O. ... 250/327.2 E

*Primary Examiner*—Rodney H. Bonck
*Assistant Examiner*—David W. Laub
*Attorney, Agent, or Firm*—Palmatier, Sjoquist & Helget

[57] ABSTRACT

The invention relates to a pulling device for providing a smooth linear pulling movement. The device comprises a shaft (8) rotatable around its longitudinal axis, a pulling nut moving linearly on the shaft and driven by the rotational movement of the shaft and arranged to have the member to be pulled to be attached to, and a motor (9) providing the rotational movement of the shaft. The linear movement of the pulling nut is advantageously provided with the aid of pulling bearings set against the shaft (8) at a pitch angle. It is essential to the invention that the rotational movement of the motor (9) is transmitted to the shaft (8) through the intermediary of a flexible O-ring (25) between mutually nested parts (8, 22) associated with the motor and the shaft. The O-ring (25) forms between said parts (8, 22) a narrow contact surface closing a circular line, the purpose of which is to keep the rotational movement of the shaft as smooth as possible. The pulling device according to the invention is well-adapted for moving, for instance, the exposed sliding plate pulled out of the RIM cassette used in X-ray photography during the reading of the information on the plate and its subsequent emptying.

5 Claims, 2 Drawing Sheets

COUPLING FOR A LINEAR PULLING DEVICE

BACKGROUND OF THE INVENTION

The object of this invention is a pulling device for providing a smooth linear pulling movement, comprising a shaft rotatable around the longitudinal axis thereof, a pulling nut moving linearly on the shaft and propelled by the rotational movement of the shaft and to which the member to be pulled is arranged to be attached, and a motor providing the rotational movement of the shaft.

The pulling device according to the invention is intended for application objects requiring extremely smooth linear movement. An example of such an application is the withdrawal of the sliding plate of a RIM cassette used in X-ray photography for reading the information recorded on the plate.

The X-ray radiation conducted through the object of the X-ray photography and modified by the absorption in the object is focused on the layer of tunable fluorescent material on the sliding plate of the RIM cassette with the information included on the radiation being recorded on the layer. After this exposure phase, the plate in the cassette is read by a separate reading device which converts, with the aid of a laser beam, the information into an image which is then displayed on a computer screen or written out on film.

The reading of the sliding plate of the RIM cassette is in practice effected by pulling the plate out of the cassette to the reading position where the information on the plate is read while the plate is in the smoothest possible linear movement. After the reading, the plate is transferred to an emptying position where it is emptied of information with the aid of a powerful light, and finally the plate is returned back to the cassette to wait for the following time of use. Previously the sliding plate has been transferred from the cassette to a separate belt conveyor for the reading and emptying of the information, but patent application FI-903796 discloses a newer solution which uses a pulling device which propels the sliding plate and pulls the plate out of the cassette and returns it back in while the reading and emptying of the information takes place during the reciprocating movement of the plate. The pulling device comprises a shaft driven by a stepper motor and rotatable around its longitudinal axis, and a pulling nut (slide) moving linearly on the shaft and engaging the sliding plate. The pulling nut is actuated by the rotational movement of the shaft through the intermediary of pulling bearings set at a pitch angle against the shaft.

Patent application FI-903796 does not closely describe the coupling of the stepper motor with the rotatable shaft. However, the solution heretofore included the coupling of the stepper motor to a flywheel via a massive rubber vibration absorber. The end of the shaft was attached to the flywheel by a screw joint. However, the difficulty with this kind of solution is that the flywheel and the shaft must be accurately concentric in order to avoid mutual lateral deviations in the rotational movements of these members. This has been a very difficult task to achieve in practice. In addition, the potential inclining of the shaft of the stepper motor has had, in the known solution, a tendency to correspondingly incline the shaft because of the limited flexibility of the massive rubber.

OBJECTS OF THE INVENTION

The purpose of this invention is to form a solution for coupling the shaft to the motor causing the axial, rotational movement thereof in such a way that lateral displacements of the shaft are avoided and thus it is possible to prevent, for instance, the deterioration of the quality of the X-ray image read from the RIM-plate resulting from the uneven movement of the shaft. The invention is characterized in that the rotational movement of the motor is transmitted to the shaft through the intermediary of a flexible O-ring between mutually nested parts associated with the shaft and the motor.

SUMMARY OF THE INVENTION

The invention is essentially characterized in that the flexible O-ring forms the most unintensive element possible to inclinations of the motor and to slight eccentricity of said nested parts, the element transmitting the rotational movement directly to the shaft. The O-ring situated at the end of the transmission chain is thus, to a great extent, able to balance the errors of the rotational movement while at the same time the sources of potential new errors are effectively eliminated.

The flexible O-ring used according to the invention is preferably of rubber and forms, between said motor and the parts associated with the shaft, a narrow contact surface coming close to a circular line. This kind of a ring enables the shaft to be set in the smoothest possible rotational movement independent of inclinations of the motor or associated transmission members or of the eccentricity between the motor and the shaft.

It is advantageous to realize the coupling according to the invention in such a way that the end of the shaft and the surrounding O-ring are situated inside the sleeve-like transmission part associated with the motor. The transmission part rigidly connected to the motor can thus act as a flywheel connecting directly to the shaft via the O-ring.

The conversion of the rotational movement of the shaft into the linear movement of the pulling nut can be effected, for instance, with the aid of pulling bearings set at a pitch angle against the shaft, as described in patent application Fi 903 796. According to said application, the pulling bearings are arranged around the shaft as two subsequent groups formed by three parallel bearings.

The main purpose of the pulling device according to the invention is to pull the sliding plate including information out of the cassette for the simultaneous reading of the plate. When the motor is arranged to revolve around the shaft in mutually opposite directions, the pulling nut can carry out a reciprocating movement on the shaft returning the plate back to the cassette after the withdrawal of the sliding plate and the reading of the information. It is preferred, for instance in X-ray photography, to couple the reciprocating movement of the sliding plate with the emptying of information from the plate with the aid of a powerful emptying light.

In addition to said uses, the invention is also applicable for other uses requiring great accuracy where the smoothest possible rotational movement of the shaft driven by a motor is required when the movement is further converted into the linear movement of the pulling nut moving on the shaft.

BRIEF DESCRIPTION OF THE DRAWINGS

In the following, the invention is described in more detail with the aid of an example and by reference to the appended drawings, where.

DETAILED DESCRIPTION OF THE PREFERRED EMBODIMENT

Figure 1:
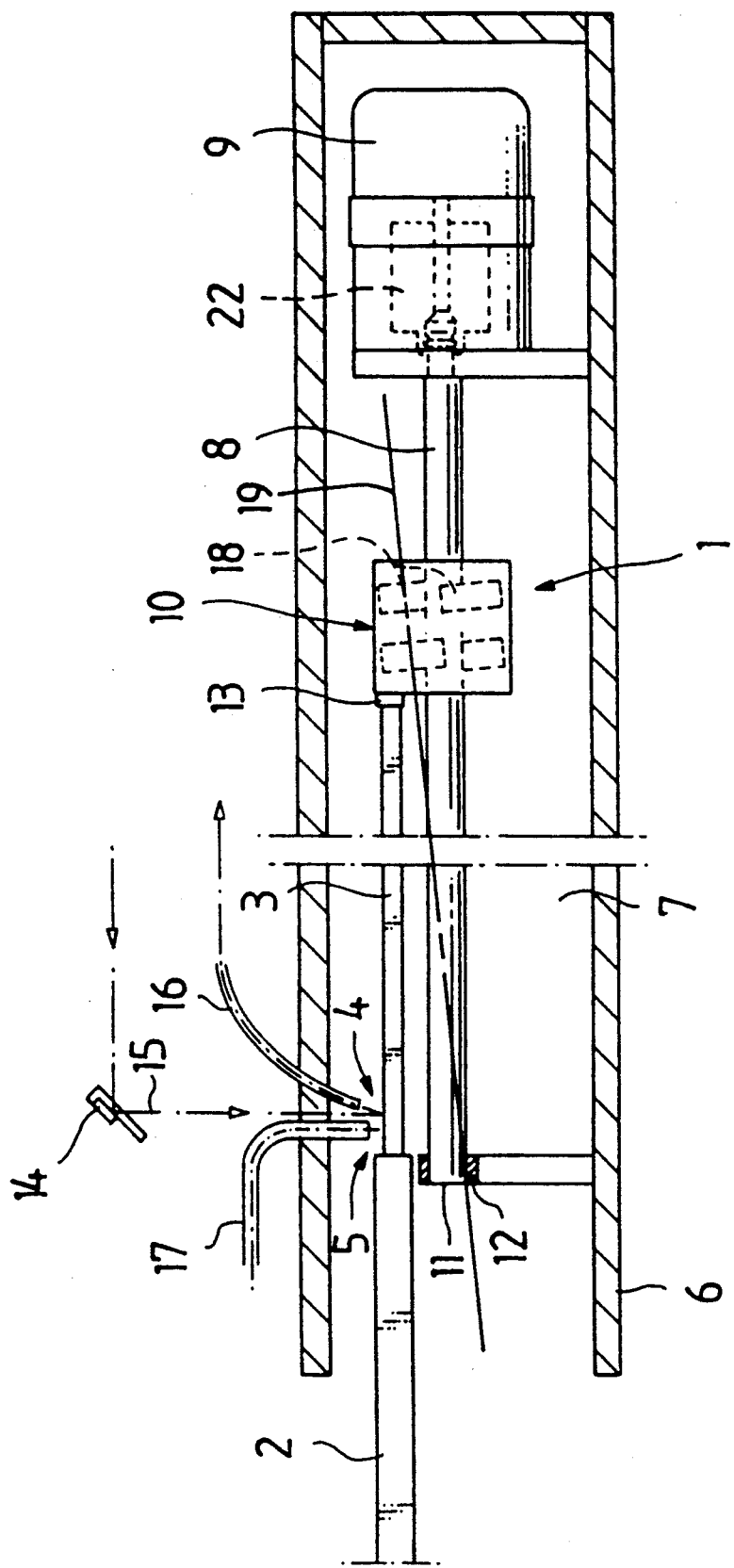
FIG. 1 shows a pulling device according to the invention as arranged to propel the exposed sliding plate of a RIM cassette during the reading of the plate and its subsequent emptying.

FIG. 1 shows pulling device 1 according to the invention as a part of the aggregate carrying out the pulling of exposed sliding plate 3 of RIM cassette 2 used in X-ray photography, out of the cassette, the reading of the information on the sliding plate in position 4 during the withdrawal, the returning of the sliding plate back to the cassette and the emptying of the information from the plate in emptying position 5 during the return movement. Said functions are effected in space 7 protected from light and surrounded by case-like body 6 of the equipment in which pulling device 1 is situated.

Pulling device 1 comprises, as the main parts thereof, shaft 8 rotatable around the longitudinal axis thereof, stepper motor 9 rotating the shaft in mutually opposite directions and pulling nut 10 moving linearly on the shaft in mutually opposite directions. Stepper motor 9 and butt 11 of shaft 8 are supported on body 6, the butt of the shaft being supported through the intermediary of annular sliding bearing 12 surrounding it. Pulling nut 10 is provided with magnets 13 engaging the edge of sliding plate 3 which is pulled out of cassette 2. The withdrawal and returning of the sliding plate back to the cassette carried out by the pulling nut is effected on these magnets.

For the reading of the information on the plate effected during the withdrawal of sliding plate 3, mirror 14 is provided above reading position 4 which guides laser beam 15 on the wavelength range of visible light in a reciprocating movement across the surface of the plate in a smooth movement. The light emitting from the surface of the plate is conducted to a light-multiplier (not shown) along photoconductor 16. The emptying of the information from sliding plate 3 is effected during the return movement of the plate in position 5, where a powerful emptying light is conducted to the surface of the plate by photoconductor 17.

The linear movement of pulling nut 10 on shaft 8 is provided by six ball bearings 18 set against the shaft and inclined at a pitch angle, and arranged around the shaft in two groups formed by three parallel bearings. The rotation of shaft 8 around its longitudinal axis sets ball bearings 18 in a rotational movement and because the direction of axes 19 of the bearings slightly deviates from the direction of the shaft, the bearings force the pulling nut into a linear movement along the shaft corresponding analogically to the movement of a conventional nut on a screw thread.

In order to prevent the rotation of pulling nut 10 along with the shaft, the pulling nut must be provided with a separate guiding member which can be comprised of, for instance, a lug terminating in a fork part provided by teflon screws and arranged to follow a separate guide bar which is in the direction of the shaft. This guide solution, which is disclosed in patent application FI-90796, is omitted from the appended drawings.

Figure 2:
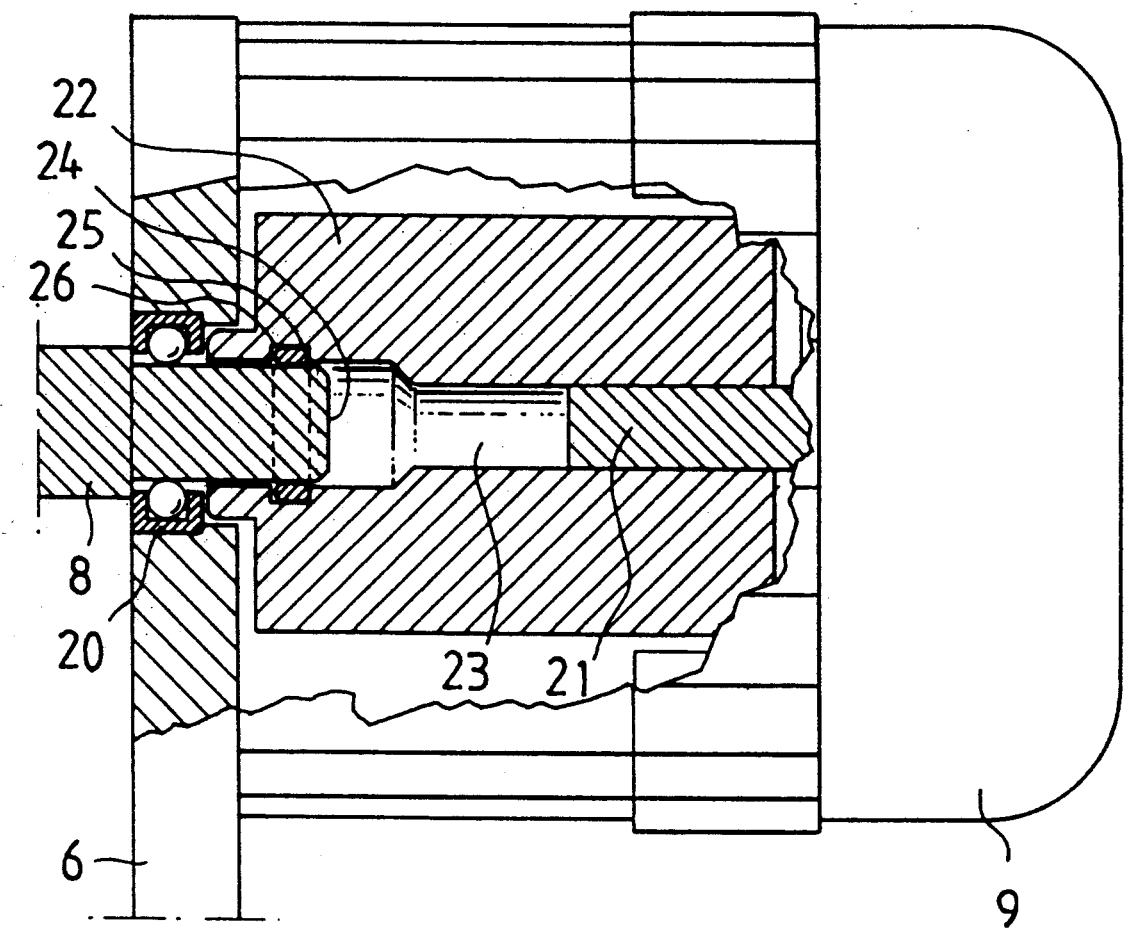
FIG. 2 shows the coupling between the motor and the shaft included in the device according to FIG. 1, partly in cross section.

FIG. 2 shows the coupling of the end of shaft 8 to motor 9 driving it and comprising the most essential part of the present invention. Motor 9 is attached to body 6 of the equipment which at the same time supports the end of shaft 8 through the intermediary of bearing 20 fitted in an opening in the body. Sleeve-like transmission part 22 provided with axial boring 23 is attached as an extention of shaft journal 21 included in motor 9. Butt 24 of shaft 8 extends to boring 23 of the transmission part from the opposite end thereof with respect to shaft journal 21. Narrow rubber O-ring 25 surrounds the end of the shaft and it is situated in internal annular groove 26 made to boring 23. The butt end of shaft 8 going inside boring 23 is dimensioned so that it is slightly narrower than the boring, whereby the shaft is in contact with sleeve-like transmission part 22 only through the intermediary of rubber O-ring 25 with the O-ring forming, between said parts, a narrow contact surface coming close to a circular line. This solution enables the rotational movement of shaft 8 to remain substantially smooth independent of potential inclinations of motor 9 and transmission part 22 rigidly joined with it, or of potential eccentricity of shaft 8 and transmission part 22.

The pulling device comprising the coupling between motor 9 and shaft 8 in accordance with the above description, was tested in a trial where the pulling nut carried out 500,000 reciprocating movements on the shaft. The device endured this test without functional failure or noticeable wear of the parts.

It is clear to those skilled in the art that different applications of the invention are not limited to the disclosed example, but can vary within the appended claims.

I claim:

1. A pulling device for providing a smooth linear pulling movement, comprising a shaft rotatable about its central axis; a pulling nut having pulling bearings surrounding said shaft and set at a pitch angle relative to said central axis whereby the rotatable movement of the shaft is converted into linear movement of the pulling nut; a drive motor and transmission driving member aligned with said shaft central axis, the driving member having an opening therein receiving at least a portion of said shaft; and a flexible O-ring about said shaft and within said opening, said O-ring being resiliently compressed between said shaft and said driving member only sufficiently to form a narrow annular contact surface when resiliently compressed between said shaft and said driving member.

2. The apparatus of claim 1, further comprising an annular groove in said driving member sized to accept said O-ring.

3. The apparatus of claim 1, further comprising a slidable plate attached to said pulling nut, and a cassette fixedly positioned to receive said slidable plate.

4. The apparatus of claim 3, wherein said drive motor and transmission driving member further comprise rotatable movement in mutually opposite directions, whereby to cause said pulling nut to withdraw said slidable plate from said cassette and to insert said slidable plate into said cassette.

5. The apparatus of claim 4, further comprising means for reading and erasing information on said slidable plate while said slidable plate is withdrawn and inserted into said cassette.

* * * * *